US012033533B2

(12) United States Patent
Kim

(10) Patent No.: US 12,033,533 B2
(45) Date of Patent: *Jul. 9, 2024

(54) SYSTEMS AND METHODS FOR INQUIRY-BASED LEARNING INCLUDING COLLABORATIVE QUESTION GENERATION

(71) Applicant: The Board of Trustees of the Leland Stanford Junior University, Stanford, CA (US)

(72) Inventor: Hong Suk Kim, San Jose, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/700,858

(22) Filed: Dec. 2, 2019

(65) Prior Publication Data

US 2020/0357297 A1    Nov. 12, 2020

Related U.S. Application Data

(63) Continuation of application No. 16/150,057, filed on Oct. 2, 2018, now Pat. No. 10,497,275, which is a
(Continued)

(51) Int. Cl.
*G09B 7/07* (2006.01)
*G06Q 10/101* (2023.01)
*H04L 12/18* (2006.01)

(52) U.S. Cl.
CPC ............. *G09B 7/07* (2013.01); *G06Q 10/101* (2013.01); *H04L 12/1827* (2013.01)

(58) Field of Classification Search
CPC ....... H04L 51/063; H04L 67/02; H04L 41/22; G09B 7/07
(Continued)

(56) References Cited

U.S. PATENT DOCUMENTS 9,959,028 B2  5/2018 Rosenberg
10,104,027 B2 10/2018 Kim
(Continued)

OTHER PUBLICATIONS

Mulye, R. et al., "Using Internet-Enabled Mobile Phones to Enhance Large Class Student Engagement: Lessons Learned", The World University's Forum 2009, vol. 2, No. 5, 2009; 18 pgs.
(Continued)

*Primary Examiner* — Emmanuel L Moise
*Assistant Examiner* — Mariegeorges A Henry
(74) *Attorney, Agent, or Firm* — KPPB LLP

(57) ABSTRACT

Systems and methods in accordance with embodiments of the invention utilize technology to facilitate student question creation. Interactive platforms such as mobile phones or tablets can allow questions to be written, saved, and communicated electronically. In one embodiment, a method for collaboratively generating a question includes generating question data in response to input of a question and answer choices on a first device, sending the question data to a repository, sending the question data from the repository to a second device, displaying the question and answer choices on the second device, generating revised question data in response to input that changes the question, sending the revised question data to the repository, sending the revised question data to a third device, displaying the question and answer choices on the third device, receiving input of the selection of answer choices on the third device, and providing feedback whether the selection is correct.

17 Claims, 11 Drawing Sheets

Related U.S. Application Data continuation of application No. 14/688,987, filed on Apr. 16, 2015, now Pat. No. 10,104,027.

(58) Field of Classification Search
USPC .................................. 709/204–206; 434/350
See application file for complete search history.

(56) References Cited

U.S. PATENT DOCUMENTS

| | | | |
|---|---|---|---|
| 2004/0029092 A1* | 2/2004 | Orr .......................... | G09B 7/02 434/354 |
| 2004/0125126 A1* | 7/2004 | Egawa ............... | H04N 21/8153 715/716 |
| 2011/0246910 A1 | 10/2011 | Moxley et al. | |
| 2012/0078826 A1* | 3/2012 | Ferrucci ................ | G06N 7/005 706/12 |
| 2012/0167007 A1 | 6/2012 | Ross et al. | |
| 2014/0272909 A1* | 9/2014 | Isensee .................... | G09B 7/02 434/362 |
| 2015/0221229 A1* | 8/2015 | Cannon ................... | G09B 7/04 434/350 |
| 2015/0370773 A1 | 12/2015 | Heineman et al. | |
| 2016/0063381 A1* | 3/2016 | Allen ...................... | G06F 16/33 706/11 |
| 2016/0308803 A1 | 10/2016 | Kim | |

OTHER PUBLICATIONS

Park et al., "A Case Study Exploring Student Engagement with Stanford Mobile Inquiry-based Learning Environment (SMILE)", GLOKAL.de, e-journal of Udeeewana, Oct. 2016, vol. 2, No. 4, Article 5, pp. 92-107.

Paterson, James et al., "Enhancing the Quality of Student-Generated MCQs: Final Report", 2011, 7 pgs.

Perlman, Dan, "Expanding Learning—through Conversation—in Our Classes", Brandeis University, Draft as of Aug. 26, 2013, pp. 1-8.

Piaget, J., "The Role of Action in the Development of Thinking", W. F. Overton, & J. M. Gallagher, Advances in Research and Theory. New York: Plenum Press, 1977, pp. 17-42.

Quillen, "How to Help Mobile Education Go Global", https://ww2.kqed.org/mindshift/2013/02/28/how-to-help-mobile-education-go-global/, 2013, 3 pages.

Reeve et al., "Elements of the Competitive Situation that Affect Intrinsic Motivation", Personality and Social Psychology Bulletin, 1996, vol. 22, No. 1, pp. 24-33.

Rothkopf, E. Z., "Learning from Written Instructive Materials: An Exploration of the Control of Inspection", American Educational Research Journal, vol. 3, Issue 4, pp. 241-249, 1966.

Rothstein, Dan et al., "Teach Students to Ask Their Own Questions", One small change can yield big results, Harvard Education Publishing Group, vol. 27, No. 5, Sep./Oct. 2011, 4 pgs.

Russell et al., "The Legacy of Gender-Based Violence and HIV/AIDS in the Postgenocide Era. Stories from Women in Rwanda", Health Care for Women International, 37:7, pp. 721-743, 2014, DOI: 10.1080/07399332.2015.

Seol, Sunmi et al., "Stanford Mobile Inquiry-based Learning Environment (SMILE): using mobile phones to promote student inquires in the elementary classroom", 2011, 7 Pages.

Sharp et al., "Mobile Science Project: Combining Inquiry-Based Learning and Mobile eBooks to Improve Attitudes Towards Science", Mobile Science Project Publication, Subproject of Programmable Open Mobile Internet for Social Cause (POMI) in Education, Jun. 2011, 36 pages.

Shen et al., "Traditional In-class Examination vs. Collaborative Online Examination in Asynchronous Learning Networks: Field Evaluation Results", Proceedings of the Tenth Americas Conference on Information Systems, New York, NY, Dec. 31, 2004, pp. 2998-3008.

Shuler, C., "Pockets of Potential: Using Mobile Technologies to Promote Children's Learning", New York: The Joan Ganz Cooney Center at Sesame Workshop, 2009, 56 pgs.

Song et al., "A Remotely Operated Science Experiment Framework for Under-Resourced Schools", Interactive Learning Environments, 2015, http://dx.doi.org/10.1080/10494820.2015.1041407, 19 pages.

Song et al., "Inquiry-based Learning Environment Using Mobile Devices in Math Classroom", Proceedings of the Association for Education Communications and Technology, 2012. Kentucky (2012): pp. 386-392.

Strijbos et al., "Unravelling peer assessment: Methodological, functional, and conceptual developments", Learning and Instruction, Aug. 2010, vol. 20, Issue 4, pp. 265-269.

Swan, K. et al., "Uses and Effects of Mobile Computing Devices in K-8 Classrooms", Journal of Research on Technology in Education, vol. 38, Issue 1, pp. 99-112, 2005.

Tamir et al., "Alternatives in Assessment of Achievements, Learning Processes and Prior Knowledge—Chapter entitled "Science Assessment"", Boston: Kluwer Academic Publishers, pp. 93-129, 1996.

Unknown Author, "Can you create a good question?", Stanford SMILE Global Instance, https://smilelearn.stanford.edu/, 2016, 3 pages.

Unknown Author, "Global Scale Technologies, Inc., Product Order Page", https://www.globalscaletechnologies.com/p-57-smileplug.aspx, 2012, 8 pages.

Unknown Author, "Marvell SMILE Plug Enabling Classroom 3.0: Secure Content, Teacher Control", Marvell Product Overview, Platform Brief, 2012, https://web.archive.org/web/20121102020635/http://www.marvell.com/solutions/education/assets/Marvell-SMILE-Plug-Platform-Brief.pdf, 2 pages.

Unknown Author, "Marvell's Smile Plug", Classroom 3.0, Sep. 23, 2013, http://www.marvell.com/solutions/education/cloud-computer-for-smile.jsp, 1 page.

Unknown Author, "SMILE (Stanford Mobile Inquiry-based Learning Environment)", http://www.unesco.org/new/en/unesco/themes/icts/m4ed/unesco-mobile-learning-week/webinar/paul-kim/, 2015, 1 page.

Unknown Author, "SMILE: Stanford Mobile Inquiry-based Learning Environment", Stanford Graduate school of Education, Office of Innovation & Technology, 2013, 1 page.

Williams et al., "Student attitudes towards approaches to learning and assessment", Assessment & Evaluation in Higher Education, vol. 17, Issue 1, 1992, 15 pgs.

Wilson et al., "Improving Faculty Teaching: Effective Use of Student Evaluations and Consultants", The Journal of Higher Education, vol. 57, Issue 2, pp. 196-211, 1986.

Yeh et al, "Implementing online question generation to fosterreading comprehension", Australasian Journal of Educational Technology, 2012, vol. 28, Issue 7, pp. 1152-1175.

Yu, F. Y., "Multiple peer assessment modes to augment online student question-generation processes", Computers & Education, vol. 19, Issue 7, Sep. 9, 2011, 2 Pages.

Yu, F. Y., "Promoting metacognitive strategy development through online question-generation instructional approach", Proceeding of international conference on computers in education, pp. 564-571, 2005.

Yu, F. Y., "Scaffolding student-generated questions: Design and development of a customizable online learning system", Computers in Human Behavior, vol. 25, Issue 5, pp. 1129-1138, Sep. 2009.

Yu, F. Y., "A web-based learning system for question-posing and peer assessment", Innovations in Education and Teaching International, vol. 42, Issue 4, pp. 337-348, Nov. 2005.

Yu, F. Y., "Student Question-Generation: The Learning Processes Involved and Their Relationships with Students' Perceived Value", Journal of Research in Education Sciences 2012, vol. 57, Issue 4, pp. 135-162.

"Studysievestudent guide" Retrieved Apr. 18, 2017 from https://www.cs.auckland.ac.nz/courses/compsci111ssc/studysieve-web-documentation.pdf, 4 pgs.

Mediamark Research & Intelligence, "Kids Intelligence," MRI report, 2010.

(56) References Cited

OTHER PUBLICATIONS

Adams, K., "Info Technology Tips and Trends", Association of College & Research Libraries, Apr. 2005, Retrieved on Nov. 22, 2014, 3 pgs.

Barak et al., "On-line question-posing and peer-asssessment as means for web-based knowledge sharing in learning", International Journal of Human-Computer Studies, 2004, vol. 61, pp. 84-103.

Beatty et al., "Question Driven Instruction: Teaching Science (Well) with an Audience Response System", Audience Response Systems in Higher Education: Applications and Cases, 2006, pp. 1-19.

Black, P., et al., "Inside the Black Box: Raising Standards Through Classroom Assessment", Phi Delta Kappa, pp. 1-14, Oct. 1998.

Bloom, B. S., "Taxonomy of educational objectives", printed Apr. 18, 2017 from http://www.edpsycinteractive.org/topics/cogsys/bloom.html, 4 pgs.

Brookhart et al., "Formative assessment that empowers", Association for Supervision & Curriculum Development, 2008, vol. 66, Issue 3, 8 pgs.

Buckner et al., "Mobile Innovations, executive functions, and educational developments in conflict zones: a case study from Palestine", Education Tech Research Dev, (2012), 60: pp. 175-192, DOI 10.1007/s11423-011-9221-6.

Buckner et al., "Integrating Technology and Pedagogy for Inquiry Based Learning. The Stanford Mobile Inquiry-based Learning Environment (SMILE)", published online Apr. 12, 2013, 22 pgs., (Author's personal copy), DOI 10.1007/S11125-013-9269-7.

Buckner et al., "Storytelling Among Israeli and Palestinian Children in the Era of Mobile Innovation", Educational Media and Technology Yearbook: vol. 36, 2011, DOI 10.1007/978-1-4614-1305-9_2, pp. 6-22.

Cheung, L., "Using Mobile Phone Messaging as a Response Medium in Classroom Experiments", The Journal of Economic Education, 2008, vol. 39, No. 1, pp. 51-67.

Cole, "Using Wiki technology to support student engagement: Lessons from the trenches", Computers & Education, 2008, vol. 52, pp. 141-146.

Commeyras, M., "What can we learn from students' questions?", Theory into Practice, Spring 1995, vol. 34, Issue 2, pp. 101-106.

Corey, S. M., "The Teachers Out-Talk the Pupils", The School Review, vol. 48, Issue 10, pp. 745-752, 1940.

Cross, K. P., "Classroom Research: Implementing the Scholarship of Teaching", American Journal of Pharmaceutical Education, vol. 60, pp. 402-407, 1996.

Dale, "Children's Questions as a Source of Curriculum Material", Educational Research Bulletin, Mar. 17, 1937, vol. 16, Issue 3, pp. 57-66.

Denny et al., "Quality of Student Contributed Questions Using PeerWise", Proc. 11th Australasian Computing Education Conference, Jan. 2009, vol. 95, pp. 55-63.

Dillon, J., "The practice of questioning", International Series on Communication Skills, London: Routledge, 1990, 306 pgs.

Dillon et al., "The remedial status of student questioning", Journal of Curriculum Studies, vol. 20, pp. 197-210, 1988.

Dodds, R. et al., "Cell Phones and PDA's Hit K-6", The Education Digest, vol. 70, Issue 8, pp. 52-53, 2005.

Dori et al., "Question-Posing Capability as an Alternative Evaluation Method: Analysis of an Environmental Case Study", Journal of Research in Science Teaching, vol. 36, Issue 4, pp. 411-430, 1999.

Gall, M. D., "The Use of Questions in Teaching", Review of Educational Research, 1970, vol. 40, Issue 5, pp. 707-721.

Gilroy, M., "Invasion of the Classroom Cell Phones", The Hispanic Outlook in Higher Education, pp. 56-60, 2004.

Gorman, "Marvell and Stanford Create SMILE Plug Cloud Computer, SMILE Consortium to get Companies and Devs to Build a Better Education System", Sep. 18, 2012, http://www.marvell.com/solutions/education/cloud-computer-for-smile.jsp, 11 pages.

Hovious, A., "Getting Students to Ask the "Right Questions"", Designer Librarian, Question Formulation Technique, Jul. 13, 2013, Retrieved on Nov. 22, 2014.

Hsu et al., "Preservice teachers' uses of SMILE to enact student-generated questioning practices", Int. J. Innovation in Education, vol. 3, Nos. 2/3, 2016, 110-121.

Hunkins, F., "Involving students in questioning", Boston: Allyn & Bacon, Inc. 1976, 273 pgs.

Kim, "Action Research Approach on Mobile Learning Design for the Underserved", Education Tech Research Dev (2009) 57. pp. 415-435.

Kim, "Effects of a 3D Virtual Reality of Plate Tectonics on Fifth Grade Students' Achievement and Attitude Toward Science", Interactive Learning Environments, vol. 14, No. 1, Apr. 2006, pp. 25-34.

Kim, "SMILE (Stanford Mobile Inquiry-based Learning Environment)", UNESCO Presentation, 2006, http:/www.unesco.org/new/fileadmin/MULTIMEDIA/HQ/ED/ICT/pdf/SMILEedited1.pdf and http://www.unesco.org/new/fileadmin/MULTIMEDIA/HQ/ED/ICT/pdf/SMILEedited2.pdf, 68 pages.

Kim et al., "A comparative Analysis of a Game-Based Mobile Learning Model in Low-Socioeconomic Communities of India", International Journal of Educational Development 32 (2012), doi:10.1016/j.ijedudev.2011.05.008, pp. 329-340.

Kim et al., "Collective Intelligence Ratio", Measurement of real-time multimodal interactions in team projects, Team Performance Management, vol. 17 No. 1/2, 2011, DOI 10.1108/13527591111114701, pp. 41-62.

Kim et al., "Creating a Temporary Spontaneous Mini-Ecosystem Through a Mooc", MOOCs and Open Education Around the World, Routledge, Jun. 12, 2015, pp. 157-168.

Kim et al., "Developement of a Design-Based Learning Curriculum Through Design-Based Research for a technology-Enabled Science Classroom", Education Tech Research Dev (2015) 63: pp. 575-602, DOI 10.1007/s11423-015-9376-7.

Kim et al., "Effects of Episodic Variations in Web-Based Avian Influenza Education: Influence of Fear and Humor on Perception, Comprehension, Retention and Behavior", Health Educ. Res., Jun. 2008, doi:10.1093/her/cyn031, 12 pages.

Kim et al., "Effects of Group Reflection Variations in Project-Based Learning Integrated in a Web 2.0 Learning Space", Interactive Learning Environments, Routledge, 2009, pp. 1-17.

Kim et al., "Mobile Technology as Empowerment Tool for the Underserved", Proceedings of 2009 IEEE Conference on Technologies for Humanitarian Challenges, 4 pages.

Kim et al., "New Evaluation Vector Through the Stanford Mobile Inquiry-Based LEarning Environment (SMILE) for Participatory Action Research", Healthcare Informatics Research, Jul. 2016, 22(3): pp. 164-171, http://dx.doi.org/10.4258/hir.2016.22.3.164.

Kim et al., "Pocket School: Exploring Mobile Technology as a sustainable Literacy Education Option for Underserved Indigenous Children in Latin America", International Journal of Educational Development 28 (2008), pp. 435-445, doi:10.1016/j.ijedudev.2007.11.002.

Kim et al., "Public Online Charter School Students: Choices, Perceptions, and Traits", American Educational Research Journal, Jun. 2012, vol. 49, No. 3, pp. 521-545, DOI 10.3102/0002831212443078.

Kim et al., "Socioeconomic Strata, Mobile Technology, and Education: A Comparative Analysis", Education Tech Research Dev (2011), 59: pp. 465-486, DOI 10.1007/s11423-010-9172-3.

Kim et al., "The Effects of a Concept Map-Based Information Display in an Electronic Portfolio System on Information Processing and Retention in a Fifth-Grade Science Class Covering the Earth's Atmosphere", British Journal of Educational Technology, vol. 39, No. 4, 2008, pp. 700-714, doi:10.1111/j.1467-8535.2007.00763.x.

Kim et al., "When Cloud Computing Meets with Semantic Web: A New Design for e-Portfolio Systems in the Social Media Era", British Journal of Educational Technology, vol. 41, No. 6, 2010, pp. 1018-1028, doi:10.1111/j.1467-8535.2010.01055.x.

Kolb, L., "Toys to Tools: Connecting Student Cell Phones to Education", Washington: International Society for Technology in Education, 2008, 24 pgs.

Lee, H. S., "Validating Measurement of Knowledge Integration in Science Using Multiple-Choice and Explanation Items", Applied Measurement in Education, vol. 24, Issue 2, pp. 115-136, 2011.

(56) References Cited

OTHER PUBLICATIONS

Marbach-Ad, G. et al., "Can Undergraduate Biology Students Learn to Ask Higher Level Questions?", Journal of Research in Science Teaching, vol. 37, Issue 8, pp. 854-870, 2000.

Mayer, R. E., "Cognitive theory of multimedia learning", The Cambridge handbook of multimedia learning, Cambridge University Press, pp. 31-48, 2005.

Mayer, R. E., "Multimedia Learning: Are We Asking the Right Questions?", Educational Psychologist, vol. 32, Issue 1, pp. 1-19, 1997.

Mosteller, F., "The "Muddiest Point in the Lecture" as a Feedback Device", On Teaching and Learning: The Journal of the Harvard-Danforth, vol. 3, pp. 10-21, 1989.

\* cited by examiner

Administrator / activity owner can delete unwanted (low quality) questions
And publish the rest.

| 1 | Why most people in DR Congo speak French today? |  |  | X |
| 2 | Why there are similarities in culture between India and Iran? |  |  | X |
| 3 | Why "Trinidad and Tobago" is the name of the country today? |  |  | X |
| 4 | Why certain countries claim that they are part of Commonwealth? |  |  | X |

CANCEL   SAVE

Participating user can select one of open-ended questions and enter possible answer choices.

Each person adopting a question becomes an owner of the selected question with a different set of answer choices. The adaptor inherits all question attributes set forth by the original question generator. The adaptor may change attributes for later question revisers.

| #1 | Why most people in DR Congo speak French today? | | |
|---|---|---|---|

| a | Why most people in DR Congo speak French today? | | X |
|---|---|---|---|
| b | Why there are similarities in culture between India and Iran? | | X |
| c | Why "Trinidad and Tobago" is the name of the country today? | | X |
| d | Why certain countries claim that they are part of Commonwealth? | | X |
| + | | | |

CANCEL    SAVE

Question Solving Mode

*Questions* — Click to see all questions generated by this user
*Answered by x*

*Question History* — Click to see all previous versions of this question $3x = -4y + 2$
$4x = -2y + 16$ a. $x = 4, y = -6$ ☐
b. $x = -2, y = 8$ ☑ ┄┄ User must choose all correct answers marked correct by the question originator
c. $x = 6, y = -8$ ☐
d. $x = 6y = -4$ ☑

Rate question ★★★★★ ┄┄ User must rate the question quality level

Tags: science

┄┄ User may leave comments to have a dialog over this question

Post

SYSTEMS AND METHODS FOR INQUIRY-BASED LEARNING INCLUDING COLLABORATIVE QUESTION GENERATION

CROSS REFERENCE TO RELATED APPLICATIONS

This application is a continuation of U.S. patent application Ser. No. 16/150,057, entitled "Systems and Methods for Inquiry-Based Learning Including Collaborative Question Generation", to Hong Suk Kim, filed Oct. 2, 2018, which is a continuation of U.S. patent application Ser. No. 14/688,987, entitled "Systems and Methods for Inquiry-Based Learning Including Collaborative Question Generation", to Hong Suk Kim, filed Apr. 16, 2015, the disclosures of which are expressly incorporated by reference herein in their entireties.

STATEMENT OF FEDERALLY SPONSORED RESEARCH

This invention was made with Government support under contract 0832380 awarded by the National Science Foundation. The Government has certain rights in the invention.

FIELD OF THE INVENTION

The present invention relates generally to learning management systems and more specifically to inquiry-based learning by generating questions in a collaborative way among multiple users.

BACKGROUND

Traditional teaching methods in many scenarios, from kindergarten through college and corporate training focus heavily on delivering teacher-led lectures and testing. Such traditional teaching methods primarily promote memorization of facts, principles, and formulas, leading to triggering of cognitive functions of low orders (e.g., simple arithmetic, simple recall, etc.) in testing events. Studies have shown that student-created questions can improve learning. When asked to pose questions themselves, students can become more engaged in the material when it is presented and as they revisit the material to create the questions.

SUMMARY OF THE INVENTION

Systems and methods in accordance with various embodiments of the invention utilize technology to facilitate student question creation. Interactive platforms such as mobile phones or tablets can allow closed-ended and open-ended questions to be written, saved, and communicated electronically.

In one embodiment, a method for collaboratively generating a closed-ended question between two or more users and answering the question by one or more users by collecting and storing question data using client devices over a network includes generating question data in response to receiving input of a closed-ended question and answer choices on a user interface of a first client device, where the question data includes information representing the closed-ended question and answer choices, sending the question data from the first client device to a question repository, sending the question data from the question repository to a second client device, displaying the closed-ended question and answer choices on the user interface of the second client device, generating revised question data in response to receiving input that changes the closed-ended question on the user interface of the second client device, sending the revised question data from the second client device to the question repository, sending the revised question data from the question repository to a third client device, displaying the finalized closed-ended question and answer choices on a user interface of the third client device, receiving input of the selection of one or more of the answer choices on the user interface of the third client device, determining whether the selection of the one or more of the answer choices is correct using an administrator console, and providing feedback concerning whether the answer choice selection is correct to the third device and displaying the feedback on the user interface of the third client device.

A further embodiment also includes receiving input that changes one or more answer choices associated with the closed-ended question on the user interface of the second device and saving the changes to the question repository.

Another embodiment also includes receiving input that sets permissions governing how the closed-ended question may be edited by another user and storing the permissions with the closed-ended question.

In a still further embodiment, the permissions specify whether the question text may be edited by another user and whether the associated answer choices may be edited by another user.

Still another embodiment also includes receiving input of a question quality rating on the user interface of the third client device.

A yet further embodiment also includes receiving session credentials from the first client device, second client device, and third client device when configured for private mode question generation.

In yet another embodiment, the question data includes text and a multimedia component.

In a further embodiment again, the closed-ended question is answered correctly when at least two answer choices are selected.

In another embodiment again, the question repository is stored on a router.

In a further additional embodiment, a method for collaboratively generating a closed-ended question from an open-ended question between two or more users by collecting and storing question data using client devices over a network includes generating question data in response to receiving input of an open-ended question on a user interface of a first client device, where the question data includes information representing the open-ended question, sending the question data from the first client device to a question repository, sending the question data from the question repository to a second client device, displaying the open-ended question on a user interface of the second client device, generating answer data in response to receiving input of answer choices on the user interface of the second client device, sending the answer data from the second client device to the question repository and modifying question metadata to indicate that the question is a finalized closed-ended question, sending the question data and answer data from the question repository to a third client device, displaying the finalized closed-ended question and answer choices on a user interface of the third client device, receiving input of the selection of one or more of the answer choices on the user interface of the third client device, determining whether the selection of the one or more of the answer choices is correct using an administrator console, and providing feedback concerning whether the answer choice selection is correct to the third device and displaying the feedback on the user interface of the third client device.

Another additional embodiment also includes sending the question data to a fourth client device, receiving input on the user interface of the fourth client device indicating a quality rating of the open-ended question and sending the received quality rating as question metadata to the question repository.

In a still yet further embodiment, sending the question data from the question repository to a second client device also includes selecting question data to be sent based on the received quality rating of the open-ended question.

In still yet another embodiment, generating question data in response to receiving input of an open-ended question on a user interface of a first client device also includes generating permission data in response to receiving input of permissions accorded to the open-ended question.

In a still further embodiment again, sending the question data and answer data from the second client device to the question repository also includes modifying question metadata associated with the question data to indicate that the question is a closed-ended question.

BRIEF DESCRIPTION OF THE DRAWINGS

FIG. 10 is a screen shot illustrating a user interface screen for receiving the input of answer choices in accordance with embodiments of the invention.

FIG. 11 is a screen shot illustrating a user interface screen for answering a question in accordance with embodiments of the invention.

DETAILED DESCRIPTION

Figure 1:
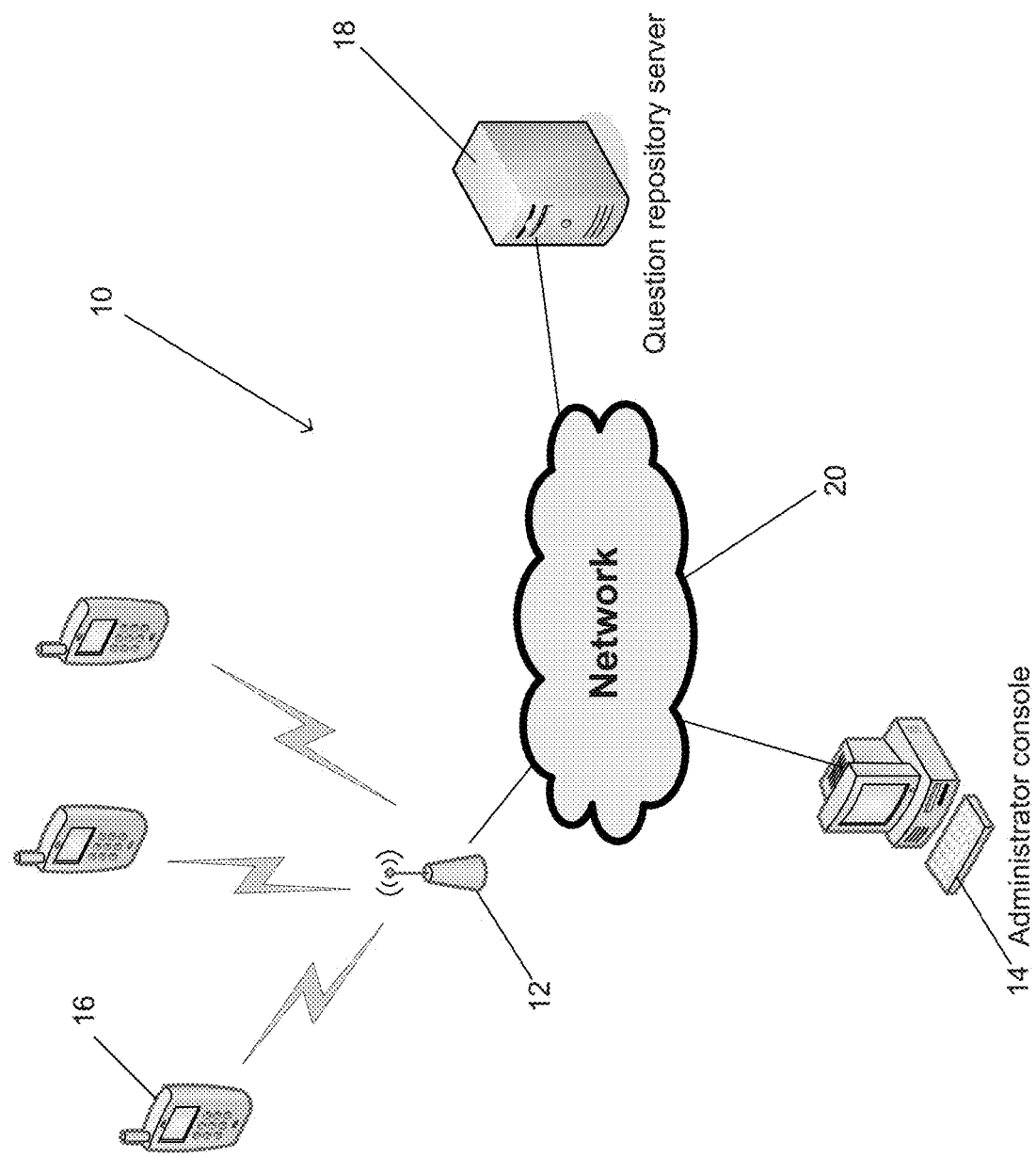
FIG. 1 is a system overview illustrated devices in a collaborative question generation system in accordance with embodiments of the invention.

Systems and methods for inquiry-based learning including collaborative question generation in accordance with embodiments of the invention are disclosed. Various embodiments of the invention enable learning activities and cognitive functions of higher orders (e.g., analysis, synthesis, evaluation, logical reasoning, critical thinking, creation of new ideas, etc.) in game-like multiple modes of education and training sessions. Participating learners may use devices such as a mobile phone or tablet to generate, analyze, and evaluate closed-ended questions with multiple possible answer choices and/or open-ended questions. A closed-ended question can limit users to respond with a list of answer choices from which they must choose and a correct answer can comprise the selection of one correct answer choice, several correct answer choices in the alternative, or several correct answer choices simultaneously. Open-ended questions may be answered without such a limit to predetermined answer choices. Participating users may formulate a question by typing question text, embedding a URL or multimedia component (e.g., audio, image) captured from sources including (but not limited to) a built-in camera in a client device or downloaded from Internet, and formulate multiple answer choices by typing in two or more selectable answer choice text strings. A question creator can set permissions governing how a question may be edited by another user (e.g., changing the question text and/or answer choices). One or more users may then edit a question and/or associated answer choices pursuant to the permissions associated with the question. In many embodiments, users may rate the quality of a question and/or the associated answer choices. The quality ratings given to questions written by a question creator by other users may be used as a factor in that user's final score. Participating users can solve a presented question by selecting one or all answer choices marked as correct by the original question creator. Several embodiments of the invention also provide participating users information on statistical analyses of a particular session of aggregates of multiple sessions to help them recognize their performance including winners of the question generation sessions and also understand how the participating users are progressing in the overall development of higher order learning skills. Systems for collaborative question generation are discussed below.

Collaborative Question Generation Systems

Users may participate in collaborative question generation using a collaborative question generation (CQG) system. In many embodiments of the invention, a CQG system can be a device and subject-agnostic learning management system designed to facilitate the creation and editing of closed-ended questions by student users on the interfaces of their devices. In various embodiments of the invention, a CQG system may include pieces of hardware and software applications that configure computing device to perform processes for collaborative question generation as will be discussed further below. A CGQ system in accordance with embodiments of the invention is illustrated in FIG. 1.

Figure 2A:
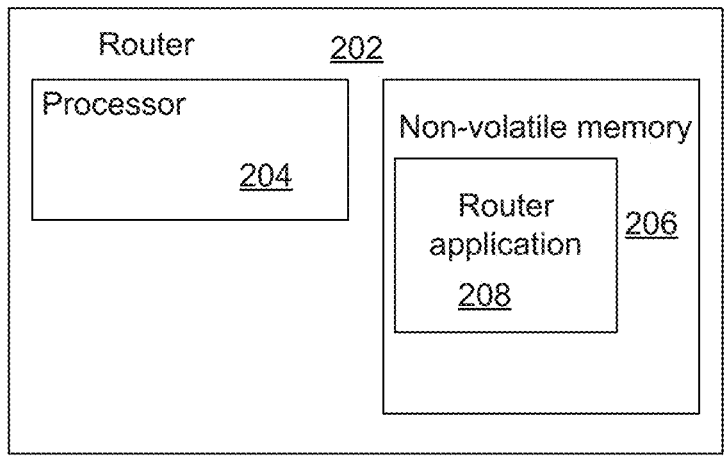
FIG. 2A conceptually illustrates a router in a collaborative question generation system that may be utilized in accordance with embodiments of the invention.

The CQG system 10 illustrated in FIG. 1 includes a router 12, an administrator console 14, client devices 16, and a question repository 18. The router 12 facilitates communication between the devices (administrator console, client devices, and/or question repository) and may do so by providing a local network for connectivity between devices and/or (optionally) connecting devices to a wider network such as the Internet. A router that may be utilized in accordance with embodiments of the invention is conceptually illustrated in FIG. 2A. The router 202 includes a processor 204 and non-volatile memory 206 containing a router application 208 that is executed by the processor 204 during operation of the router.

Figure 2B:
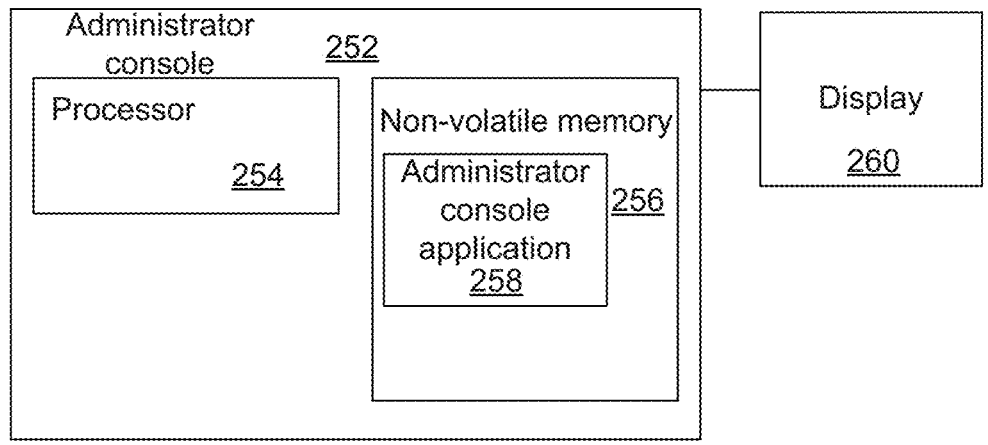
FIG. 2B conceptually illustrates an administrator console in a collaborative question generation system that may be utilized in accordance with embodiments of the invention.

Referring again to FIG. 1, the administrator console 14 provides centralized control of the collaborative question generation system. As will be discussed further below, an administrator may use the administrator console to coordinate and signal the phases in a question generation session. In various embodiments of the invention, the administrator console 14 may be a computer, notebook, netbook, or other computing device. One skilled in the art will recognize that an administrator console may be any of a variety of computing hardware as appropriate to the particular application. An administrator console that may be utilized in accordance with embodiments of the invention is conceptually illustrated in FIG. 2B. The administrator console 252 includes a processor 254, non-volatile memory 256 containing an administrator console application 258 that is executed by the processor 254 during execution of the administrator console, and a display 260 which can display a user interface. In some embodiments, the display can also capture input, such as via touch screen or other method. In other embodiments, a keyboard and/or mouse or other input device can be used to capture input.

Figure 2C:
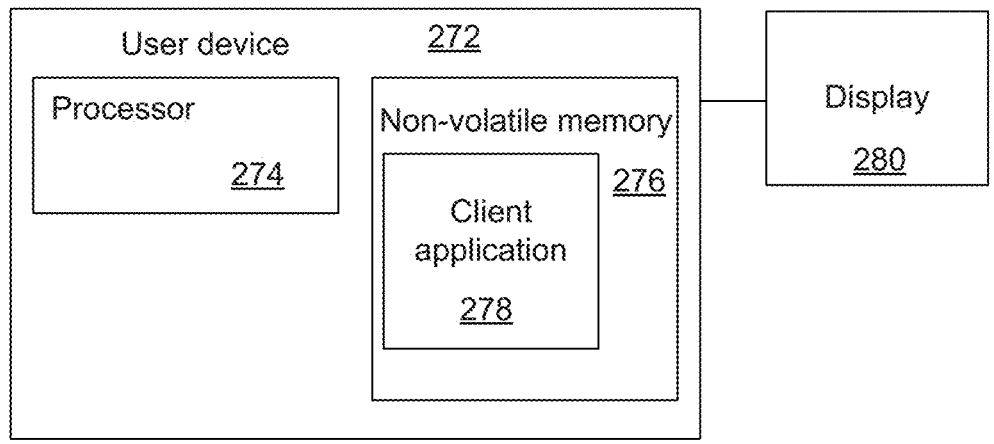
FIG. 2C conceptually illustrates a client device in a collaborative question generation system that may be utilized in accordance with embodiments of the invention.

Referring again to FIG. 1, each client device 16 may include a user interface allowing a user to perform various activities during a question generation session such as, but not limited to, writing and/or editing one or more questions and answer choices, rating the quality of questions, and/or selecting answer choices in answering questions by receiving input on the interface or other input device, as will be discussed further below. Software such as a web application or native mobile application may be stored in memory and/or executed on the client device 16 to facilitate question generation processes such as those discussed below. In various embodiments of the invention, a client device 16 may be a mobile phone, tablet, or other computing device. One skilled in the art will recognize that a client device may be any of a variety of computing hardware as appropriate to the particular application. A client device that may be utilized in accordance with embodiments of the invention is conceptually illustrated in FIG. 2C. The client device 272 includes a processor 274, non-volatile memory 276 containing a client application 278 that is executed by the processor 274 during execution of the client device, and a display 280 which can display a user interface. In some embodiments, the display can also capture input, such as via touch screen or other method. In other embodiments, a keyboard and/or mouse or other device can be used to capture input.

In many embodiments of the invention, a question repository stores questions that have been created by users and one or more edited versions of the questions. In several embodiments, a question repository is a relational database or other data structure suitable for data retrieval. In some embodiments, a question repository is stored on a server 18 on the network as illustrated in FIG. 1. In other embodiments, the question repository is stored on the administrator console 14. In still further embodiments, the question repository is stored on the router 12.

While specific hardware and software components of a collaborative question generation (CQG) system are discussed above, one skilled in the art will recognize that any of a variety of hardware and software may be utilized in accordance with embodiments of the invention. Question data and question metadata that describe questions are discussed below.

Question Data and Metadata

In various embodiments of the invention, a user can input text and/or attach media using the user interface of a client device in order to form a question. Answer choices associated with the question can be generated similarly. A question originator or creator (user who initially wrote the question) and/or the question owner (user who controls permissions over the question) may set permissions governing how other users may modify a question. The stored electronic representation of questions, answer choices, and permissions may be referred to as question data, answer choice data, and permission data respectively.

Question data may have question metadata associated with it that describes or provides additional information about question data. Question metadata can include information such as, but not limited to, an identifier that identifies the question originator or creator, an identifier that identifies the question owner, an indicator of whether the question is a closed-ended or open-ended question, permissions governing how users may modify a question, and/or links or identification of earlier and/or later versions of the question (e.g., other related question data). Answer choice data and permission data may similarly have associated answer choice metadata and permission metadata.

Permissions can include allowing or denying certain actions to users other than the question creator and/or question owner such as, but not limited to, the ability to change any portion of the question, change the question text, change attached or linked media, change answer choices or answer text, and/or take ownership of the question for other groups or activities.

As will be discussed further below, closed-ended or open-ended questions and/or associated answer choices may be given quality ratings by users based on various criteria such as, but not limited to, the quality or relevance of the question and/or answer choices. In various embodiments, quality ratings may be a numerical value selected from a range of numbers or may be a ranking of questions against other questions (or similarly a ranking of answer choices against other answer choices). For example, a set of questions may be rated numerically as 5, 3, and 7 within a range of 1 to 10 or, alternatively, ranked 2, 3, and 1 against each other within the set of three questions. Ratings may also be generated as votes collected from users. Quality ratings given to questions or answer choices may be stored as question metadata or answer metadata associated with the corresponding question or answer choice.

As will be discussed further below, in several embodiments of the invention, closed-ended or open-ended questions and/or associated answer choices may be edited by users other than the question creator. Each version of a question that is edited may be stored as separate question data with associated question metadata. Metadata, such as permissions, associated with an earlier version of a question may be copied to a later version of the question. In this way, later versions may "inherit" metadata from an earlier version of a question. Processes for collaborative question generation using question data and metadata are discussed below.

Synchronous Question Generation Sessions

Figure 3:
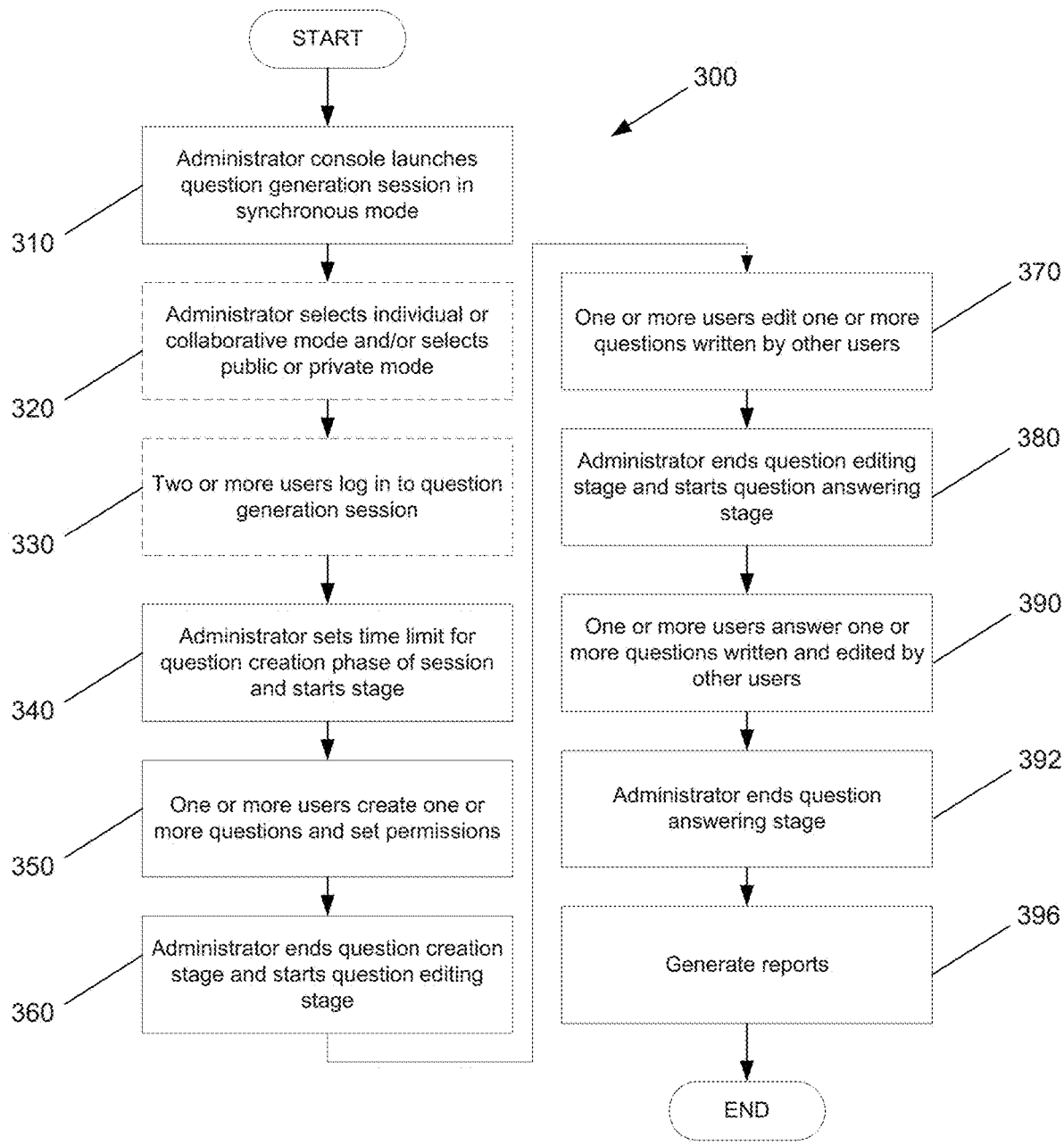
FIG. 3 is a flow chart illustrating a process for collaborative question generation in a synchronous mode in accordance with embodiments of the invention.

In several embodiments of the invention, a collaborative question generation (CQG) session using a collaborative question generation system can be launched in a synchronous mode. In synchronous mode, a predetermined number of users may progress through stages that include creating questions, editing created questions into a final form, and answering finalized questions using client devices that can communicate with other client devices and/or a central server. A process for collaborative question generation in synchronous mode in accordance with embodiments of the invention is illustrated in FIG. 3. The process 300 includes launching (310) the CQG session from an administrator console. The session may be configured (320) by an administrative coordinator as individual or collaborative with a set time limit for the session and/or various stages within the session. In individual mode, users generate questions to compete against other participating users where achieving a higher rating in the quality of their question(s) is the goal. In collaborative mode, one or more groups of users work together to generate questions to compete against other groups of users where achieving a higher rating in the quality of their group's question(s) is the goal. The session may also be designated by the administrative coordinator as public or private mode. In public mode, anyone may access the session using an appropriately configured client device. In private mode, each user must enter a predetermined code (e.g., session credentials) or authenticate by other means to join the session.

The process may include receiving (330) login credentials from one or more users logging into their device with user credentials (e.g., login identification and password) and awaiting a start signal. User credentials may be authenticated locally on the device, with a central server, or in any of a variety of other login mechanisms as appropriate to the particular application.

The administrative coordinator may set (340) a time limit for the question creation stage of the session and provide a start signal to the participating users using the administrator console.

One or more users may create a question using the interface on their client device. In many embodiments, the question is written as a closed-ended question with a finite selection of potential answer choices. Participating users who are question creators may formulate a question by typing question text and/or embedding a URL or multimedia component (e.g., audio, image) captured by a built-in camera on the client device or downloaded from the Internet. Multiple answer choices can be formulated by typing in two or more selectable answer choice texts and/or embedding a URL or multimedia component (e.g., audio, image) captured by a built-in camera from the client device or downloaded from the Internet.

A question creator may set permissions for each created question that specify how the question may be edited by another user in a subsequent question editing stage. Different permissions may include, but are not limited to, the ability to edit the text of the question, edit the answer choices to be presented with the question, and/or edit embedded media in the question or answer choices. The electronic representation of questions, answer choices, and permissions is generated (350) by the client device and may be referred to as question data, answer choice data, and permission data respectively. Question data, answer choice data, and permission data may be stored locally on the client device and/or uploaded to a central question repository immediately upon completion, at a predetermined time interval, or in response to a request for upload received from the administrator console or question repository. In many embodiments, a user identifier that identifies the user that created the question (the question creator) is associated with the question data. In some embodiments, a user identifier is sent from the client device to the question repository with question data. In other embodiments, the user identifier need not be sent from the client device when the question repository already has information with which it can identify the user, for example, by inferring the user by identifying the client device or when the communication of question data inherently identifies the client device.

When the question creation stage is complete (e.g., when the time limit expires), the administrator may send (360) a stop signal using the administrator console and client devices may display a stop message to the users. The administrator may select one or more of the created questions for editing and/or answering by other users. The administrator starts the question editing stage and may set a time limit for the stage.

In the question editing stage, one or more users may edit one or more questions created by another user or group of users based on the permissions associated with each created question. Questions and/or answer choices may be edited according to permissions as described above. The user(s) may also rate the quality of questions based on the question presented, answer choices, and/or embedded media. In many embodiments, a quality rating may be given as a numerical value, for example, in a range of one to five or one to ten. Various ranges may be utilized in accordance with embodiments of the invention. In several embodiments, questions and answers may be given separate quality ratings. Quality ratings may be associated with the corresponding question and stored as quality rating data. In many embodiments, quality rating data includes a numerical value and a user identifier indicating which user provided that quality rating. Quality rating data may be generated by a client device in response to input by a user and sent to a question repository for storage with question data. As will be discussed further below, quality ratings of questions created by a user may be used as a component in calculating the user's final score.

In response to the changes made via the user interface, the editing user's client device generates (370) revised question data and sends the revised question data to the question repository.

When the question editing stage is complete (e.g., when the time limit expires), the administrator may send (380) a stop signal from the administrator console and client devices may display a stop message to the users. After the editing stage, the questions may be designated as being in final form or "finalized." The administrator may select one or more of the finalized questions for answering by other users. The administrator starts the question answering stage and may set a time limit.

In the question answering stage, one or more users may answer one or more questions created and edited by another user or group of users. A question may be answered by selecting one or more answer choices designated by the question creator and/or editor to be presented with the question. The user(s) may also rate the questions based on question quality, answer choices, and/or embedded media. The selected answers are sent (390) to the administrator console or question repository for scoring.

When the question answering stage is complete (e.g., when the time limit expires), the administrator may send (392) a stop signal from the administrator console and client devices may display a stop message to the users.

Reports may be generated (396) based on information collected during the stages. Reports may include information such as, but not limited to, quality ratings of questions including an indication of the individual or group question creator with the highest rating, scores of users including an indication of the individual or group with the highest score of correctly answered questions, collective statistics on how questions were answered by all the students within a class, and/or time spent in creating or answering questions by users. In several embodiments of the invention, a user's score or grade may be calculated from the number of questions answered correctly and the quality rating received by questions that the user created. Reports may also show the questions, answer choices, and comments regarding one or more questions. Comments can include, but are not limited to, questions about a question, identified flaws in a question, identifying incorrect or absent answer choices. Processes for question generation in an asynchronous mode in accordance with embodiments of the invention are described below.

Asynchronous Question Generation Sessions

Figure 4:
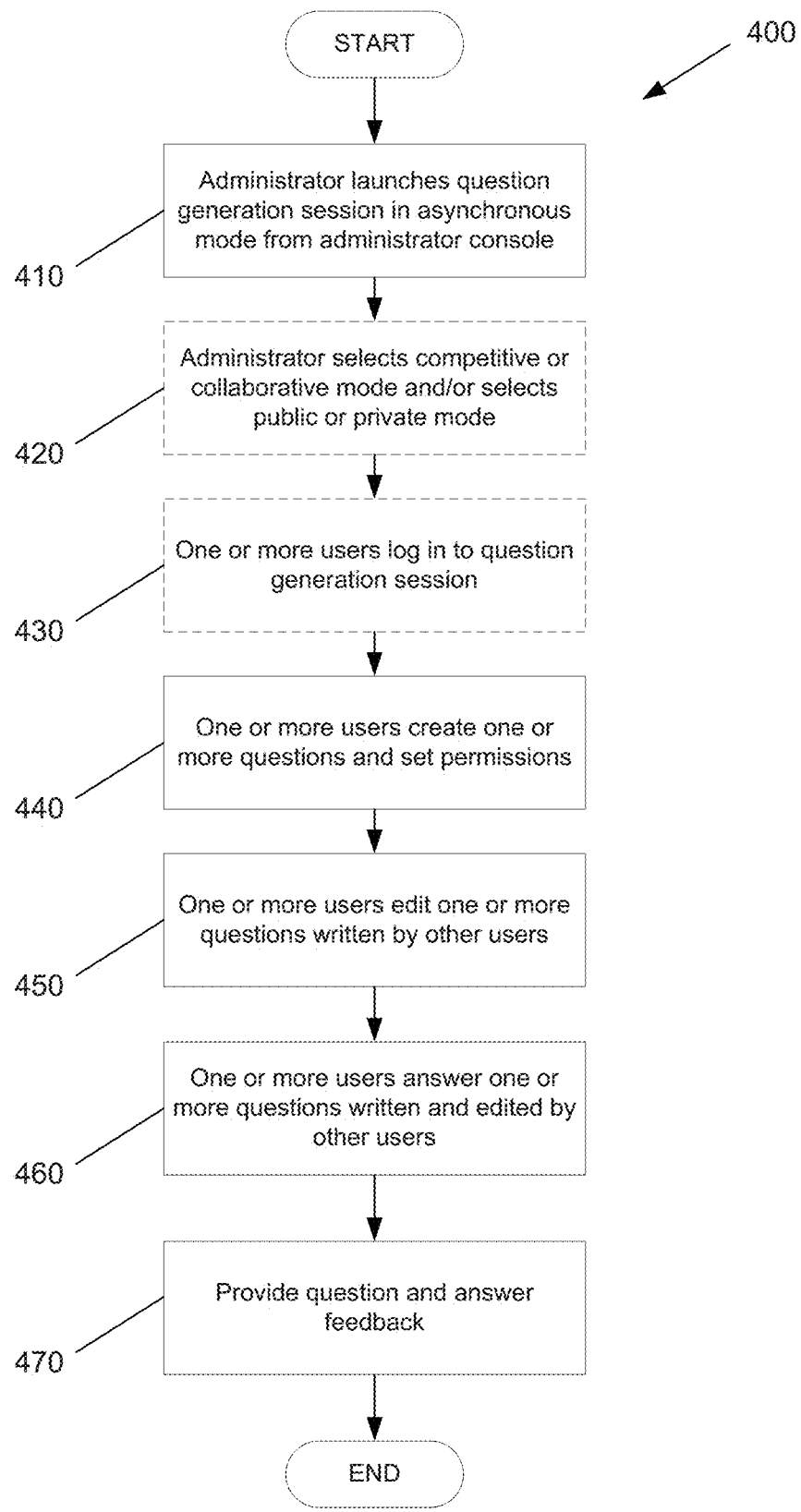
FIG. 4 is a flow chart illustrating a process for collaborative question generation in an asynchronous mode in accordance with embodiments of the invention.

In several embodiments of the invention, a collaborative question generation (CQG) session using a collaborative question generation system can be launched in an asynchronous mode. In asynchronous mode, a predetermined number of users may individually and independently participate in stages that include creating questions, editing created questions into a final form, rating the quality of questions and/or answers, and answering finalized questions using client devices that can communicate with other client devices and/or a central server. In some embodiments, the stages can be configured with time limits. A process for collaborative question generation in asynchronous mode in accordance with embodiments of the invention is illustrated in FIG. 4. The session may be designated by an administrative coordinator as individual or collaborative with a set time limit for the session and/or various stages within the session. In individual mode, users generate questions to compete against other participating users where achieving a higher rating in the quality of their question(s) is the goal. In collaborative mode, or more groups of users work together to generate questions to compete against other groups of users where achieving a higher rating in the quality of their group's question(s) is the goal. The session may also be designated by the administrative coordinator as public or private mode. In public mode, anyone may access the session using an appropriately configured client device. In private mode, each user must enter a predetermined code (e.g., session credentials) or authenticate by other means to join the session.

The process 400 includes launching (410) a question generation session in asynchronous mode from an administrator console. Question generation may be designated (420) as individual question generation mode or collaborative question generation mode. In individual question generation mode, one or more users may each create one or more closed-ended questions and associated answer choices. In collaborative question generation mode, one or more groups of users may each create one or more closed-ended questions and associated answer choices. Users may log in to the question generation session by providing user credentials that are authenticated with client device and/or the administrator console. The login credentials are received (430) and validated.

One or more users may create a question using the interface on their client device. In many embodiments, the question is written as a closed-ended question with a finite selection of potential answer choices. Participating users who are question creators may formulate a question by typing question text and/or embedding a URL or multimedia component (e.g., audio, image) captured by a built-in camera on the client device or downloaded from the Internet. Multiple answer choices can be formulated by typing in two or more selectable answer choice texts and/or embedding a URL or multimedia component (e.g., audio, image) captured by built-in camera from the client device or downloaded from Internet. In response to receiving input of the question on the user interface, the client device generates (440) question data.

A question creator may set permissions for each created question that specify how the question may be edited by another user (e.g., by question editors in collaborative mode). Different permissions may include, but are not limited to, the ability to edit the text of the question, edit the answer choices to be presented with the question, and/or edit embedded media in the question or answer choices. The question(s) and associated answer choices and permissions may be stored locally on the client device and/or uploaded to a central question repository immediately upon completion, at a predetermined time interval, or in response to a request for upload received from the administrator console or question repository.

One or more users may edit one or more questions created by another user based on the permissions associated with each created question. Questions and/or answer choices may be edited according to permissions as described above. The user(s) may also rate the questions based on question quality, answer choices, and/or embedded media. A question may be designated in final form as a finalized question by the question creator or a question editor. A finalized question may be then available for answering. Each version of an edited question may be saved for later review. The editing user's client device generates (450) revised question data from the input received.

One or more users may answer one or more questions using the interface on their client device(s). Questions may be retrieved from an administrator console and/or question repository and presented to a user by the client device. In many embodiments, a question may be retrieved by any of a number of question criteria including, but not limited to, by topic, subject, grade level, quality rating, and/or access frequency. A client device requesting a question may be provided a question pre-selected by a server or may search for a question by any of a number of interest criteria including, but not limited to, keyword, subject topic, user name, and/or geographic location. The user may select an answer choice and the answer choice is communicated (460) from the client device to the server. The user may also provide a comment to the question for other participating users to view and the comment is associated with the question by the server.

In several embodiments, questions may be provided to a client device by an administrator console and/or question repository for presentation to a user in assessment mode or an adaptive learning mode. In assessment mode, an examination is assembled with a predefined set of questions in one or more selected subjects. The administrator console and/or question repository selects a set of questions according to any of a variety of criteria such as, but not limited to, one or more subjects (e.g., math, science, history, accounting, etc.), grade or education level (e.g., 5th grade, basic, advanced, undergraduate, graduate, etc.), and/or question type (e.g., simple recall, critical thinking, question difficulty, question quality, etc.).

In adaptive learning mode, the administrator console and/or question repository selects one or more initial questions according to criteria such as those discussed above. When a user answers the initial questions and the answer choice(s) selected by the user are received by the administrator console and/or question repository, it selects one or more subsequent questions based on whether the answers were correct and a quality algorithm. The quality algorithm may determine whether subsequent questions should be a higher quality level or lower quality level based on whether a predetermined number of correct answers were selected by the user in a predetermined number of answered questions.

For example, if a set of three questions were all answered correctly, a set of three higher quality level questions will be presented to the user next.

The administrator console and/or question repository can provide (470) information about the answered questions at the time each question is answered and/or in a report at the end of the answering stage to the client devices for presentation to the user. This information can include, but is not limited to, the correct answers to answered questions and the historic percentages of answer choices selected by users, as well as other types of information as described in the synchronous mode further above.

Processes for Collecting Question Data

Figure 5:
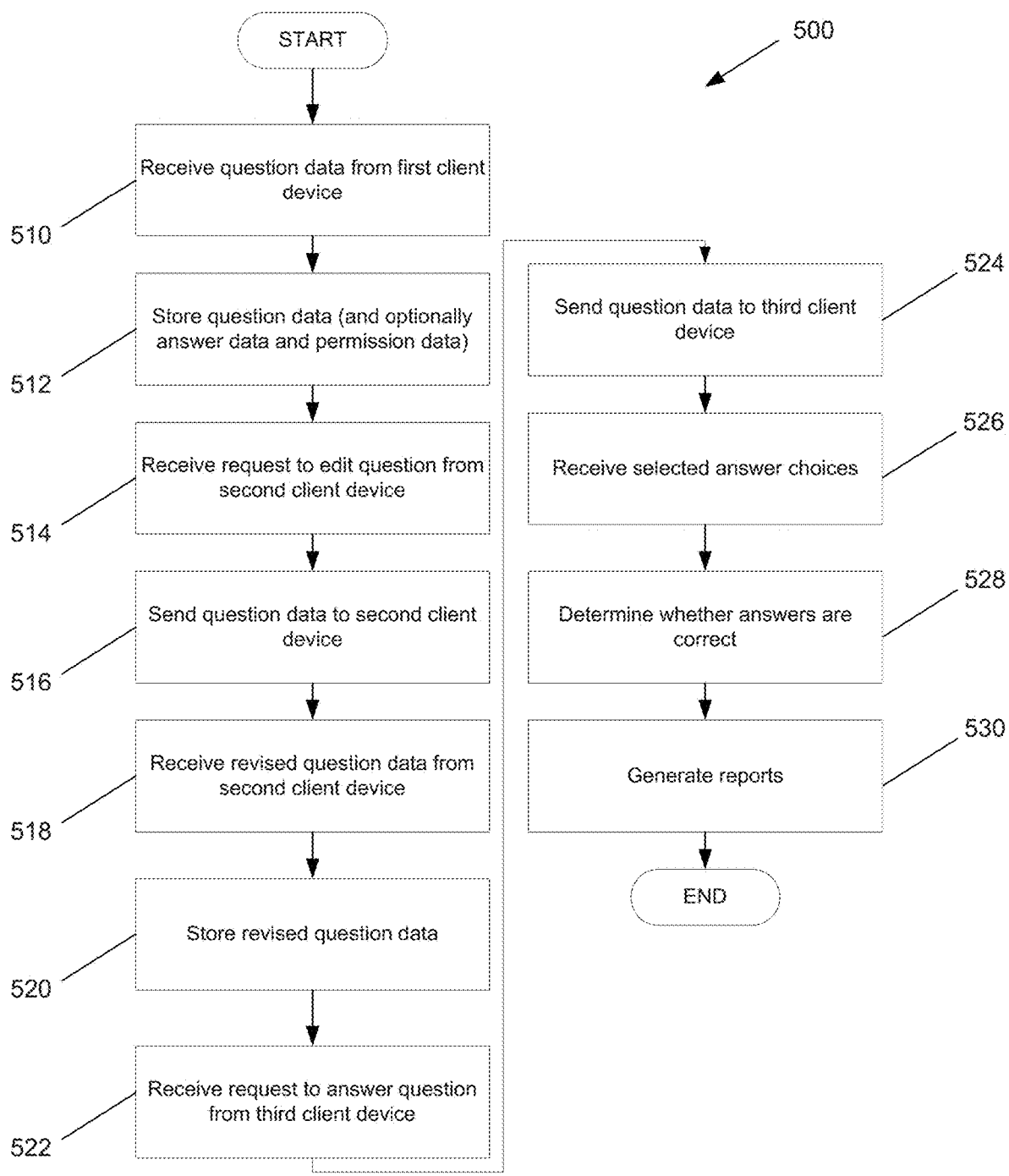
FIG. 5 is a flow chart illustrating a process for receiving and distributing question data in accordance with embodiments of the invention.

As discussed further above, an administrator console may direct client devices in question generation processes and a question repository may be utilized to store and transfer question data in accordance with embodiments of the invention. A process for coordinating a collaborative question generation session by receiving and distributing question data in accordance with embodiments of the invention is illustrated in FIG. 5. The specific repositories of question data and the computing systems that coordinate transfers of data between client devices can vary depending upon the requirements of a specific application. The process discussed below may be performed by an administrator console, a question repository, and/or any of a variety of computing devices incorporated within a system for inquiry based learning as appropriate to a particular application in accordance with various embodiments of the invention.

The process 500 includes receiving (510) question data from a first client device. In many embodiments, question data is generated in response to a question being entered on a user interface on the client device. Answer choice data and/or permission data may also be sent with the question data. The received data is stored (512) in the question repository.

A request to edit a question can be received (514) from a second client device. Question data representing the question can be sent (516) to the second client device and the question displayed on the user interface of the second client device for editing. Revised question data representing the updated question can be received (518) by the question repository from the second client device. Revised answer choice data and/or quality rating data may also be sent with the revised question data. Received data can be stored (520) in the question repository.

A request to answer a question can be received (522) from a third client device and/or multiple additional devices. Question data representing the question can be sent (524) to the third client device and the question displayed on the user interface of the third client device for answering. The data indicating the selected answer choices can be received (526) from the third client device and a determination made (528) whether the answer(s) are correct. In addition, data indicating a score assigned to the question and/or various components of the question can be received from the third device. Reports may be generated (530) showing a user's results as discussed further above.

Processes for Generating Open-Ended Questions

Figure 6:
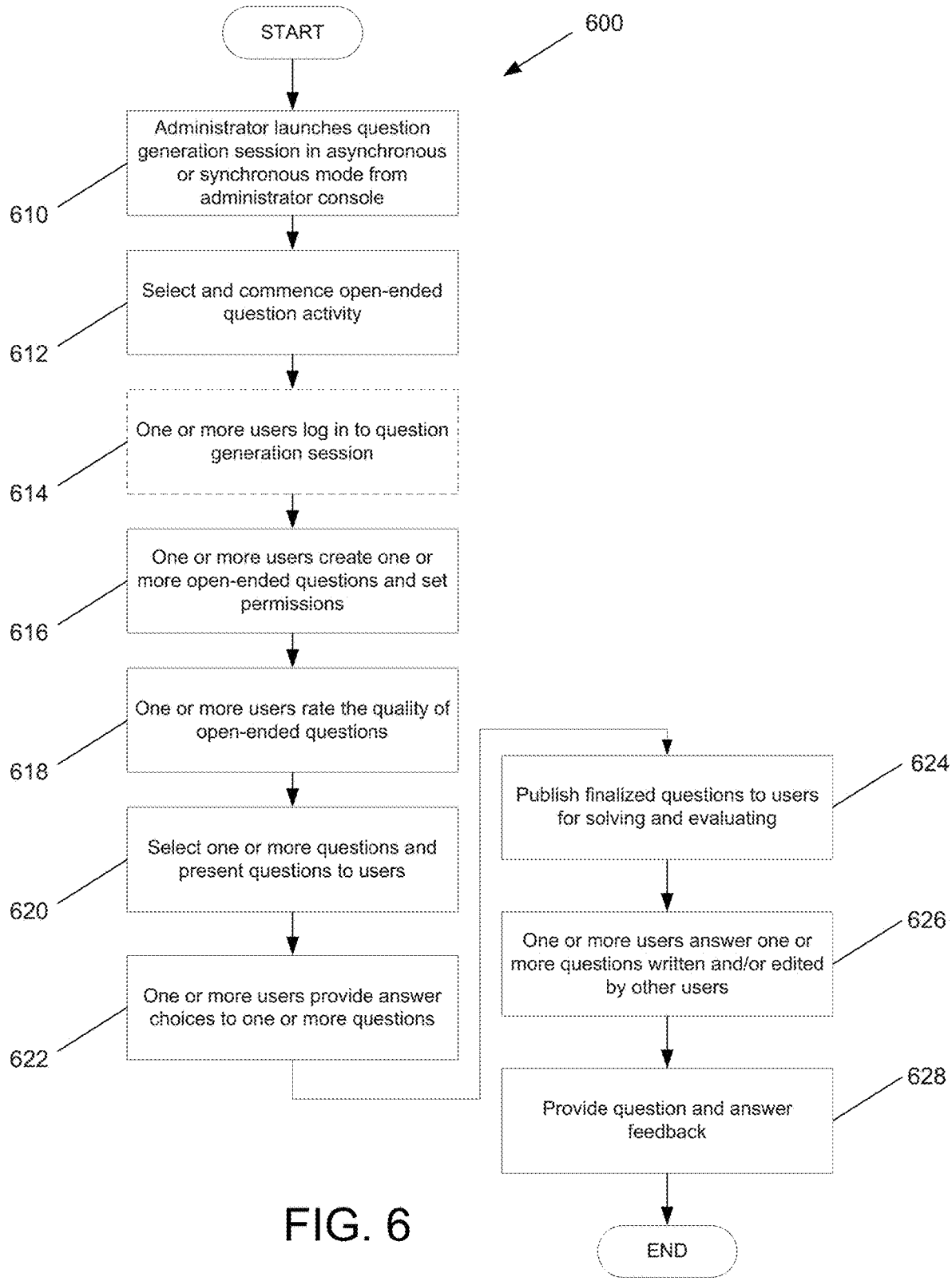
FIG. 6 is a flow chart illustrating a process for collaborative question generation of open-ended questions in accordance with embodiments of the invention.

An open-ended question that does not have a limited set of answer choices may be converted to a closed-ended question by providing and associating a set of answer choices. In many embodiments of the invention, an open-ended question can be generated and converted into a closed-ended question by multiple users collaboratively using a collaborative question generation system. A process for generating open-ended questions and converting open-ended questions into closed-ended questions using a collaborative question generation system in accordance with embodiments of the invention is illustrated in FIG. 6. The specific repositories of question data and the computing systems that coordinate transfers of data between client devices can vary depending upon the requirements of a specific application. The process discussed below may be performed by an administrator console, a question repository, and/or any of a variety of computing devices incorporated within a system for inquiry based learning as appropriate to a particular application in accordance with various embodiments of the invention.

The process 600 includes launching (610) a question generation session from an administrator console. An open-ended question activity is selected (612) and commenced from the console. Users may log in to the question generation session by providing user credentials that are authenticated via a client device and/or the administrator console. The login credentials are received (614) and validated.

Figure 7:
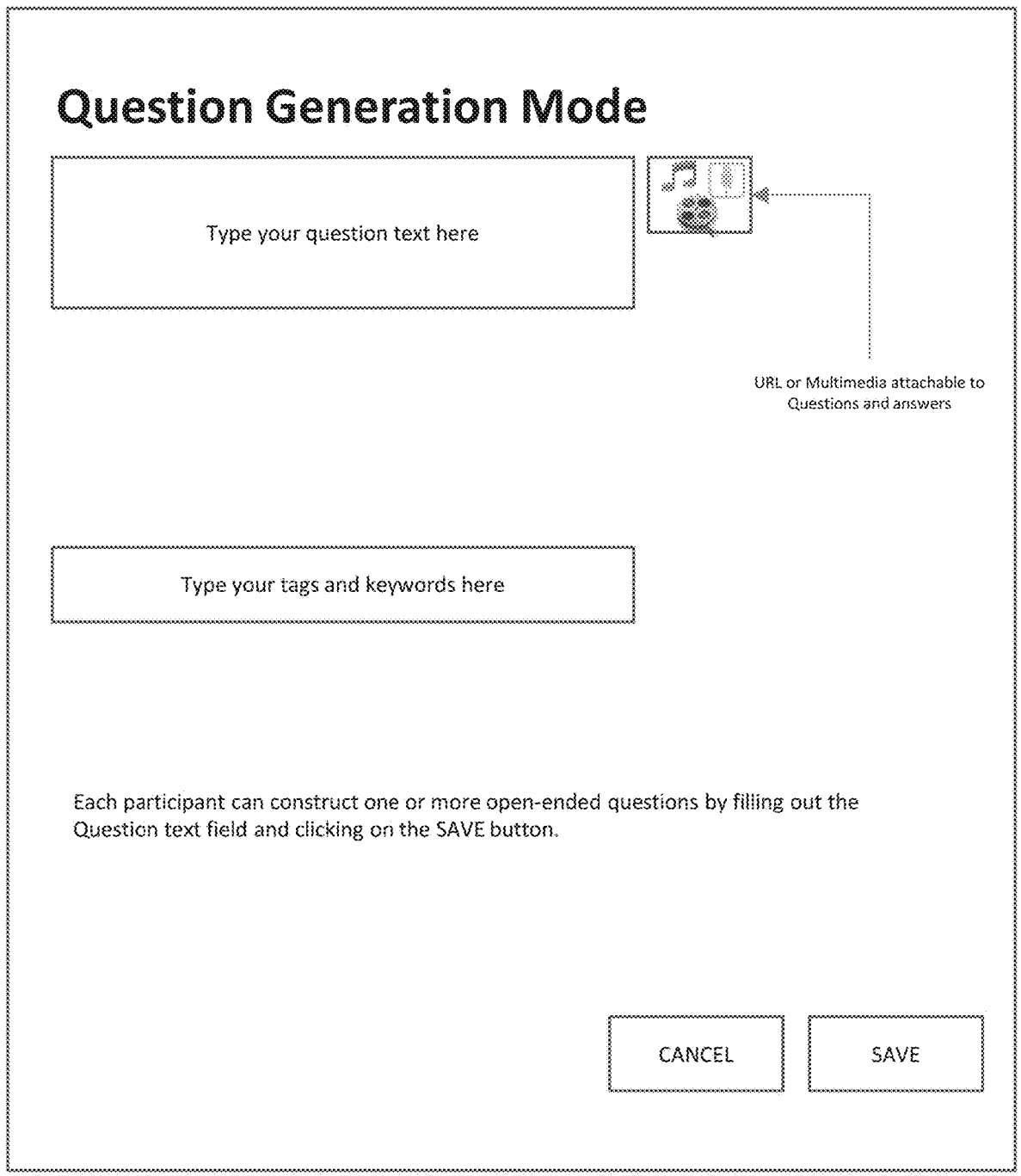
FIG. 7 is a screen shot illustrating a user interface screen for receiving the input of a question in accordance with embodiments of the invention.

One or more users may create (616) a question using the interface on their client device. In many embodiments, the question is written as an open-ended question without pre-selected potential answer choices. A user interface screen suitable for receiving the input of a question in accordance with embodiments of the invention is illustrated in FIG. 7. The screen includes fields for entering question text and associated media.

Participating users who are question creators may formulate a question by typing question text and/or embedding a URL or multimedia component (e.g., audio, image) captured by a built-in camera on the client device or downloaded from the Internet. In many embodiments, question data is generated in response to a question being entered on a user interface on the client device. Permission data may also be generated in response to the setting of permissions governing rights to the question as discussed further above. Question data and associated permission data may be sent to and stored in a question repository.

Figure 8:
FIG. 8 is a screen shot illustrating a user interface screen for receiving the input of a quality rating for a question in accordance with embodiments of the invention.

Question data representing one or more generated questions may be sent from the question repository to one or more other client devices for users to rate (618) the quality of the questions. Question data representing the question(s) can be sent to the client devices and the question displayed on the user interface of the client device(s) for rating. Quality ratings may be given, for example, as numerical values in a range or comparatively ranked as discussed further above. The assigned ratings from each user are saved as question metadata and sent to and stored in the question repository. A user interface screen suitable for receiving the input of a quality rating for a question in accordance with embodiments of the invention is illustrated in FIG. 8. The screen displays question text and associated media with a ranking from 1-4 of each question and buttons to change the ranking of the questions.

Figure 9:
FIG. 9 is a screen shot illustrating a user interface screen for selecting questions to display based on quality ratings in accordance with embodiments of the invention.
Figure 9:
Figure 9:
Figure 9:
Figure 9:
Figure 9:
Figure 9:
Figure 9:

One or more open-ended questions are selected and presented (620) to users. Question data associated with the questions are sent from the question repository to the users' client devices and the questions are displayed on the user interfaces of the client devices. Questions to be presented may be selected automatically or manually by any of a variety of criteria that can include, but are not limited to, the quality ratings given to questions. A user interface screen suitable for selecting questions to display based on quality ratings in accordance with embodiments of the invention is illustrated in FIG. 9. The screen displays question text and associated media with a ranking from 1-4 of each question and buttons to edit the selection of each question.

Question data representing the open-ended question(s) can be sent to the client devices and the question(s) displayed on the user interfaces of the client devices to solicit the creation of answer choices. Users may input (622) answer choices onto the user interfaces. A user interface screen suitable for receiving the input of answer choices in accordance with embodiments of the invention is illustrated in FIG. 10. The screen displays the question text and associated media and fields for editing answer choices. The captured answer choices can be saved as answer data, sent to the question repository, and associated with the corresponding question data. Questions having associated answer choices may then be considered closed-ended questions and the question metadata may be modified to indicate this status. Finalized closed-ended questions may be sent (624) to users' client devices for answering as in the processes described further above. A user interface screen suitable for answering a question in accordance with embodiments of the invention is illustrated in FIG. 11. The screen displays the question creator's identity, a link to view previous versions of the question, the question text and answer choices, quality rating selection, and a comment box for leaving comments about the question.

The data indicating the selected answer choices can be received (626) from the client devices and a determination made whether the answer(s) are correct. In addition, data indicating a score assigned to the question and/or various components of the question can be provided. Reports may be generated (628) showing a user's results as discussed further above. While a specific process for generating closed-ended questions from open-ended questions is described above, one skilled in the art will recognize that any of a variety of processes may be utilized to generate closed-ended questions in accordance with embodiments of the invention and that the processes described above may be combined or altered as appropriate to the requirements of a specific application. For example, closed-ended questions generated from open-ended questions such as by processes described above may be utilized in synchronous or asynchronous collaborative question generation for further editing by various users as described further above. Furthermore, one skilled in the art will recognize that portions of the processes for collaborative question generation discussed above may be combined and/or interchanged between the different processes as appropriate for a specific application in accordance with embodiments of the invention.

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A method for collaboratively generating a closed-ended question between two or more users and answering the question by one or more users by collecting and storing question data using client devices over a network, the method comprising:
generating question data in response to receiving input of a closed-ended question and a plurality of answer choices on a user interface of a first client device, where the question data comprises information representing the closed-ended question and the plurality of answer choices;
sending the question data from the first client device to a question repository;
sending the question data from the question repository to a second client device;
receiving input from the second client device comprising a first quality rating and a change to the question data, wherein the first quality rating is a user-generated score of a quality of the question in the question data, and the change to the question data represents at least one change to at least one of the closed-ended question and the plurality of answer choices;
generating revised question data in response to the received changes to the question data, wherein the revised question data includes the change to the question data;
sending the revised question data to the question repository;
sending the revised question data from the question repository to a third client device;
receiving input of the selection of one or more of the plurality of answer choices from the revised question data from the third client device and a second quality rating, wherein the second quality rating is a user-generated score of a quality of the question in the revised question data;
determining whether the selection of the one or more of the plurality of answer choices from the revised question data is correct using an administrator console; and
generating a report comprising changes to the question data and client data for the first, second, and third client devices, wherein client data for the first client device includes an evaluation of the user of the first client device's question based on the first quality rating from the second client device, client data for the second client device includes an evaluation of the user of the second client device's question revisions based on the second quality rating from the third client device, and client data for the third client device includes whether the user of the third client device answered the revised question correctly.

2. The method of claim 1, further comprising receiving input that sets permissions governing how the closed-ended question may be edited by another user and storing the permissions with the closed-ended question.

3. The method of claim 2, wherein the permissions specify whether the question text may be edited by another user and whether the associated answer choices may be edited by another user.

4. The method of claim 1, further comprising receiving session credentials from the first client device, second client device, and third client device when configured for private mode question generation.

5. The method of claim 1, wherein the question data comprises text and a multimedia component.

6. The method of claim 5, wherein the first and second quality ratings represent a quality score for the multimedia component.

7. The method of claim 1, wherein the closed-ended question is answered correctly when at least two answer choices are selected.

8. The method of claim 1, wherein the question repository is stored on a router.

9. The method of claim 1, further comprising:
wherein receiving input from the second client device further comprises receiving user-generated comments;

wherein receiving input from the third client device further comprises receiving user-generated comments; and wherein generating the report further comprises including the user-generated comments from the second and third client devices that provide context for the first and second quality ratings.

10. A method for collaboratively generating a closed-ended question from an open-ended question between two or more users by collecting and storing question data using client devices over a network, the method comprising:

generating question data in response to receiving input of an open-ended question from a first client device, where the question data comprises information representing the open-ended question;

sending the question data to a question repository;

sending the question data from the question repository to a second client device;

receiving a plurality of answer choices and a first quality rating from the second client device, wherein the plurality of answer choices represent at least one correct answer to the open-ended question and the first quality rating is a user-generated score of a quality of the open-ended question;

generating answer data in response to the received plurality of answer choices;

sending the answer data to the question repository;

modifying question metadata to indicate that the question is a finalized closed-ended question;

sending the question data and answer data from the question repository to a third client device;

receiving input of the selection of one or more of the plurality of answer choices and a second quality rating from the third client device, wherein the second quality rating is a user-generated score of a quality of the answer choices in the finalized closed-ended question, and relevance of the question and answer choices in the finalized closed-ended question;

determining whether the selection of the one or more of the plurality of answer choices is correct using an administrator console; and generating a report comprising changes to the question data and client data for the first, second, and third client devices, wherein client data for the first client device includes an evaluation of the user of the first client device's open-ended question based on the first quality rating from the second client device, client data for the second client device includes an evaluation of the user of the second client device's answer choices for the closed-ended question based on the second quality rating from the third client device, and client data for the third client device includes whether the user of the third client device answered the closed-ended question correctly.

11. The method of claim 10 further comprising:

sending the question data to a fourth client device;

receiving input on the user interface of the fourth client device indicating a third quality rating of the open-ended question; and updating the report to include the third quality rating to further evaluate the user of the first client device's open-ended question.

12. The method of claim 11 wherein sending the question data from the question repository to a second client device further comprises selecting question data to be sent based on the first quality rating of the open-ended question.

13. The method of claim 10 wherein generating question data in response to receiving input of an open-ended question on a user interface of a first client device further comprises generating permission data in response to receiving input of permissions accorded to the open-ended question.

14. The method of claim 10 where sending the question data and answer data from the second client device to the question repository further comprises modifying question metadata associated with the question data to indicate that the question is a closed-ended question.

15. The method of claim 10, wherein at least one of the open-ended question and the plurality of answer choices comprises a multimedia component.

16. The method of claim 15, wherein the first and second quality ratings represent a quality score for the multimedia component.

17. The method of claim 10, further comprising:

wherein receiving input from the second client device further comprises receiving user-generated comments;

wherein receiving input from the third client device further comprises receiving user-generated comments; and wherein generating the report further comprises including the user-generated comments from the second and third client devices that provide context for the first and second quality ratings.

* * * * *